United States Patent [19]

King

[11] Patent Number: 5,255,733
[45] Date of Patent: Oct. 26, 1993

[54] HYBIRD VEHICLE COOLING SYSTEM

[75] Inventor: Edward T. King, Dearborn, Mich.

[73] Assignee: Ford Motor Company, Dearborn, Mich.

[21] Appl. No.: 926,626

[22] Filed: Aug. 10, 1992

[51] Int. Cl.⁵ ........................ F02N 17/06; B60L 11/02
[52] U.S. Cl. ........................ 165/39; 165/41; 123/142.5 R; 180/65.3
[58] Field of Search .................... 165/39, 41; 123/142.5 R, 142.5 E; 180/65.2, 65.3, 65.4

[56] References Cited

U.S. PATENT DOCUMENTS

| | | | |
|---|---|---|---|
| 2,746,400 | 5/1956 | Holin | 105/99 |
| 3,035,652 | 5/1962 | McLean | 180/10 |
| 3,395,770 | 8/1968 | Babbitt, Jr. | 180/61 |
| 3,719,881 | 3/1973 | Shibata et al. | 180/65.4 X |
| 3,835,903 | 9/1974 | Masaki et al. | 165/39 X |
| 4,050,536 | 9/1977 | Pristash | 180/66 B |
| 4,199,037 | 4/1980 | White | 180/65.3 X |
| 4,318,449 | 3/1982 | Salisbury | 180/65.4 |
| 4,424,775 | 1/1984 | Mayfield, Jr. et al. | 123/142.5 R |
| 4,448,157 | 5/1984 | Eckstein et al. | 123/142.5 R |
| 4,470,476 | 9/1984 | Hunt | 180/65.3 X |
| 4,532,894 | 8/1985 | Wulf et al. | 123/142.5 R X |
| 4,588,040 | 5/1986 | Albright, Jr. et al. | 180/65.4 X |
| 4,753,284 | 6/1988 | Krause et al. | 165/11.1 |
| 4,756,359 | 7/1988 | Greer | 123/142.5 R X |
| 4,762,170 | 8/1988 | Nijjar et al. | 123/142.5 R X |
| 4,935,689 | 6/1990 | Fujikawa et al. | 123/142.5 R X |
| 5,141,173 | 8/1992 | Lay | 180/65.3 X |
| 5,147,005 | 9/1992 | Haeggstrom | 180/65.3 X |

Primary Examiner—John Rivell
Attorney, Agent, or Firm—Jerome R. Drouillard; Roger L. May

[57] ABSTRACT

A cooling system for a hybrid vehicle consisting of an electrical traction motor for driving the vehicle wheels, electrical energy storage and supply means such as a battery or batteries, alternator/generator, or a combination of the two, for supplying the electrical energy to the motor, and an independently operable ICE auxiliary power unit for driving the alternator/generator and charging the battery or batteries; the cooling system not only cooling the motor, but having flow circuits selectively operable to prewarm the ICE prior to engine start-up, to reduce the output of emissions.

17 Claims, 1 Drawing Sheet

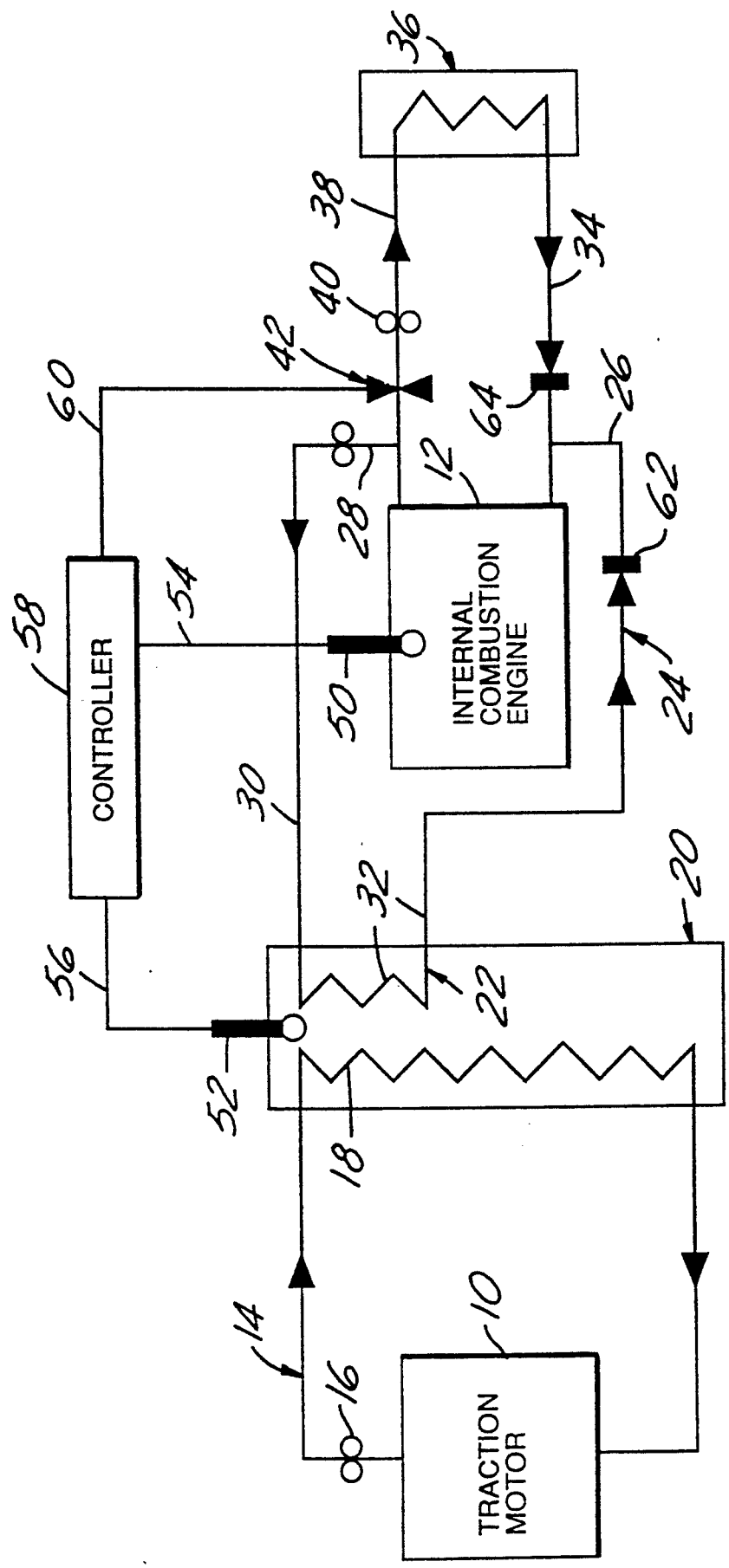

HYBIRD VEHICLE COOLING SYSTEM

FIELD OF THE INVENTION

This invention relates in general to a hybrid vehicle having electric motor driven wheels and an internal combustion engine for driving a power source for the electric motor. More particularly, it relates to a unique cooling system for the motor and internal combustion engine.

BACKGROUND OF THE INVENTION

Hybrid vehicles generally consist of an electric traction motor, or motors, that drive the vehicle wheels, storage batteries to supply electrical energy to the traction motor, and some sort of generator/alternator driven by an internal combustion engine (ICE) to charge the batteries and/or provide the power for the traction motor. In a series hybrid vehicle there is no mechanical connection between the drivewheels and the ICE. The ICE is used only to drive the alternator/generator. The engine/alternator combination provides a means of converting the chemical energy of the fuel to electrical energy.

This particular invention is directed specifically to a series hybrid type of vehicle. The series hybrid design described has several advantages:

(1) If the batteries are of appropriate storage capacity, the engine/alternator combination, more commonly known as an auxiliary power unit (APU) or range extender, will not be turned on for slow speed, short trip usage. Therefore, during this type of operation, the vehicle emits no exhaust emissions. The owner charges the batteries at home, and uses the vehicle as a "grocery getter." A significant portion of its usage will be emission-free.

(2) The APU would come into usage only when the vehicle has depleted its stored electrical energy, either by driving long distances and/or operating at high power levels at freeway speeds. Onboard microprocessors and controllers monitor such conditions and would be able to anticipate the start-up of the APU. With such anticipation, the APU can be started under very controlled conditions to minimize exhaust emissions, the vast majority of which are generated at start-up.

The design of a series hybrid vehicle places heavy emphasis in utilizing the stored electrical energy (battery) before the chemical (fuel) energy is used by the APU. As such, the traction motor will have been in use for a significant period of time prior to the need for the APU. Due to inherent energy conversion losses in electric traction motors, generators, and internal combustion engines, each of these systems requires a cooling system. The purpose of the cooling system proposed by this invention is to scavenge waste heat normally dissipated from the electric traction motor and utilize it to elevate the coolant temperature of the (ICE) prior to start-up, to thereby reduce the output of emissions. More particularly, the cooling of the traction motor can be done in such a way that the resultant waste heat energy becomes available for a system that could use it; i.e., the ICE.

In a hybrid vehicle, start-up of the ICE is independent from the initial drive-away of the vehicle since the ICE is not provided for powering the wheels of the vehicle. When this is possible, the conditions under which engine start-up occurs can be optimized. It is well documented that nearly 80% of a conventional ICE powered automobile's emissions are generated during cold start-up and drive-away, as mentioned above. An engine maintained at some elevated temperature, optimally 125° F. to 180° F., for example, could be started without the need for fuel enrichment, i.e., air/fuel ratios richer than stoichiometric (chemically correct A/F ratio), resulting in significantly improved exhaust emissions. The invention, therefore, provides a cooling system in which the ICE is preheated by the absorption of waste heat from the traction motor to thereby minimize exhaust emissions.

The cooling system of the invention provides two paths of circulation for the ICE coolant as a function of the temperature of the ICE coolant, both being through the engine, one, however, being through the engine and a first heat exchanger in heat exchanging relationship with the waste heat of the traction motor when the ICE is not running; the other being through a second heat exchanger, such as a conventional radiator, when the engine is running.

DESCRIPTION OF THE PRIOR ART

U.S. Pat. No. 4,532,894 to Wulf et al. describes an ICE engine 1 for driving the vehicle at times, the circulation of the engine cooling water having two circuits, one being through a thermostatic valve 7 in one path into and out of an electrically driven water pump 9, through an optional auxiliary heater 10 (to quickly heat the water if desired), and then an electrically heated heat exchanger 11, and therefrom through other heat exchangers 13 or bypassed back to the engine. A second path for the ICE cooling water is opened when the thermostatic valve 7 opens (the water is above a predetermined temperature) to pass water through the engine radiator and therefrom back to the engine.

The ICE in Wulf is used to drive the vehicle in contrast to supplying power to an electrical traction motor for electrically driving the vehicle, as in this invention In this invention, the ICE provides a means of converting fuel to electrical energy by means of driving the traction motor rather than the vehicle. Such is not the case in Wulf. A further difference is that the heat exchanger 11 in Wulf is not heated by the waste from the electrical vehicle drive means. Wulf does not describe the electrical drive means.

U.S. Pat. No. 4,935,689 to Fujikawa et al. describes and shows in FIG. 1 a vehicle mounted engine generator system having a main vehicle wheel driving ICE, E1 and a secondary ICE for driving a generator G2. A first water pump P1 circulates the engine (E1) coolant through the radiator R1 and vehicle heater H1. A second water pump P2 uses waste heat of the second ICE to heat the first engine coolant in the radiator R1. In contrast to the invention to be described, Fujikawa does not show or describe a cooling system for a hybrid vehicle. There is no electrical vehicle wheel driven traction motor; the ICE does not drive the power means for the electrical driving motor, and the waste heat of the electrical driving motor is not used to preheat the ICE.

U.S. Pat. No. 4,050,536 to Pristash describes a vehicle driven by four Wankle-type air motors 26-29, one at each wheel, the air being supplied by an air compressor driven by an ICE. The input air to the ICE is warmed by the airflow going over the vehicle brakes and drive motors. The exhaust from the drive motors is ducted to atmosphere. There is no interchange between the cooling systems of the motors and the ICE, or any temperature sensitive controls indicated.

U.S. Pat. No. 2,746,400 to Holin, U.S. Pat. No. 3,035,652 to McLean, Jr. and U.S. Pat. No. 4,753,284 to Krause et al. are directed merely towards cooling means for generators or traction motors, whether it be a heat exchanger for the generator as in Krause, cooling ducts as in Holin, or air passages as in McLean, Jr.

U.S. Pat. No. 3,395,770 to Babbitt, Jr. describes an electric vehicle in which the electric drive motors (not shown) are powered by a generator driven by an ICE. The invention is directed toward cooling the drive motors and generator. No description is given of the cooling system of the ICE.

U.S. Pat. No. 4,756,359 to Greer describes a truck power plant having a main ICE and an auxiliary ICE for driving the accessories when the main engine is not running. The exhaust gases of the auxiliary engine are used to heat the main engine coolant by means of a heat exchanger. The auxiliary ICE does not provide power for the main engine.

SUMMARY OF THE INVENTION

The overall purpose of the invention is to provide a cooling system for a hybrid vehicle having an electric traction motor for driving the wheels of the vehicle, energy supply means connected to the traction motor to power the same, and an ICE for driving the energy supply means, the start-up of the ICE being independent of the drive of the vehicle. The cooling system in this case utilizes the waste heat of the traction motor to preheat the engine when its cooling system is below a predetermined desired or operating level, and to maintain the engine cooling system at that level so long as the engine is not running. This is done by circulating the engine coolant through a primary heat exchanger in a heat exchange relationship with the traction motor coolant to scavenge the waste heat from the traction motor to the engine coolant. When the ICE is running, the engine coolant is then circulated through a second heat exchanger in an attempt to maintain the engine coolant at its desired operating level.

It is, therefore, a primary object of the invention to provide a cooling system for a hybrid engine that includes a traction motor drive and an ICE accessory power unit (APU) operable independently of the traction motor to preheat the ICE when it is not in a running condition to reduce or minimize the output of emissions when the ICE is started up.

Other objects, features and advantages of the invention will become more apparent upon reference to the succeeding, detailed description thereof, and to the single FIGURE illustrating the preferred embodiment thereof.

BRIEF DESCRIPTION OF THE DRAWING

The single FIGURE schematically and diagramatically illustrates a cooling system for a hybrid vehicle embodying the invention.

DESCRIPTION OF THE PREFERRED EMBODIMENT

The FIGURE depicts a closed loop cooling system for a traction motor, indicated in general by the block 10, and an independently operable ICE indicated by the block 12. The details of construction and operation, per se, of the traction motor and ICE are not given as they are believed to be unnecessary for an understanding of the invention. Suffice it to say that the traction motor 10 would be an electrical traction motor supplied with electrical energy from a power source such as a battery or series of batteries, not shown, or by an alternator/generator, also not shown, or by a combination of the two, the alternator/generator being powered in this case, by the ICE 12. As such, the traction motor would be connected to drive the wheels of the hybrid vehicle, by means not shown.

The ICE would drive only the accessory, in this case, the alternator/generator, and, therefore, be independent of the start-up of traction motor 10. As such, the ICE, as stated previously, would be shut down and not running a large majority of the time. However, to minimize exhaust emissions upon start-up of the ICE, it is desirable to warm the engine coolant to its operating temperature so that upon start-up, fuel/air ratios other than stoichiometric need not be used, and, therefore, the output of emissions would be reduced.

Turning now to the means for preheating the ICE 12, the coolant for the traction motor 10 in this particular case is a liquid coolant that circulates in a closed loop 14 (indicated by the arrows) by means of an electric pump 16. It is circulated through one side 18 of a heat exchanger 20. The opposite side of the heat exchanger is in heat exchanging relationship with a liquid coolant circuit 22 forming part of a closed loop system (indicated by the arrows) through the ICE 12. It includes the conduits 24, 26, into and out of the ICE, 28, 30 and 32.

The ICE is provided with a second closed loop coolant circulating system into and out of the engine defined by the conduits 34, a second heat exchanger 36, such as, for example, a conventional radiator, and conduit 38 containing an engine driven coolant pump 40. An electrically operated valve means 42 is located in the juncture or intersection between the two closed loop systems to preclude the engine coolant from circulating through more than one circuit at the same time.

The valve means 42 is selectively/automatically solenoid operated to alternate positions to open and close the respective circuits. In effect, the valve controls the circulation of coolant into and out of the engine through a main conduit or passage/path from either the one branch path circuit, including the heat exchanger 20, or the other branch path circuit including the heat exchanger 36. This is done as a function of the operativeness or inoperativeness of the ICE 12 and the temperature level of the ICE coolant as well as that of the traction motor.

The system includes a pair of temperature responsive sensors, an engine coolant temperature sensor 50, and a traction motor coolant temperature sensor 52. The two sensors are interconnected by electrical wiring 54 and 56, respectively, to a thermal controller 58. The latter is also connected by wiring 60 to the solenoid of the electrically controlled valve 42.

Completing the construction, the primary or first-mentioned coolant circuit for the ICE 12 through heat exchanger 20 includes a one-way check valve 62 that prevents backflow of engine coolant into the heat exchanger 20 when operation determined by valve 42 is through heat exchanger 36. Alternatively, a second one-way check valve 64 is provided in the second circuit through heat exchanger 36 to prevent circulation in this loop when the position of the electrically controlled valve 42 is such as to initiate coolant flow and circulation through heat exchanger 20.

In operation, therefore, the traction motor 10 is liquid cooled by the circulation of pump 16 of the liquid coolant in the direction of the arrows shown through heat exchanger 20. The liquid coolant for the traction motor is different from that of the liquid coolant of the ICE 12. The level of the temperature sensors 52 and 50 and the thermal controller 58 are set such that when temperature sensor 52 for the traction motor reaches a temperature greater than that of the ICE sensor 50, and the vehicle is in use, but the ICE is not running, the thermal controller 58 closes the solenoid of the valve 42. This activates the electric coolant pump 29 to circulate engine coolant through heat exchanger 20 and the cooling circuit consisting of conduits 32, 24, back into the engine to preheat the ICE coolant and engine. To conserve the hybrid vehicle's electric energy, the ICE coolant temperature sensor 50 is constantly monitored by the thermal controller 58 to cycle electrical coolant pump 29, as needed, to maintain the ICE 12 at the desired elevated coolant temperature level. That is, if the level should drop below the desired one, the electric pump will be activated, whereas if the level reaches or tends to exceed the desired level, the electric pump will be shut off.

When the ICE 12 is running or in operation, then the thermal controller 58 will open the solenoid operated valve 42 and engine coolant pump 40 will circulate coolant through the second heat exchanger 36, the one-way check valve 64 permitting this particular circulation, the one-way check valve 62 preventing circulation of the coolant back through heat exchanger 20.

From the foregoing, it will be seen that the invention provides a cooling system for a hybrid engine that minimizes the output of exhaust emissions by preheating an accessory power unit ICE by utilizing the waste heat from an electrical traction drive motor connected to the drivewheels of the vehicle when the ICE is not in operation, and a system that provides cooling for the ICE coolant in a different manner when the ICE is in operation.

While the invention has been shown and described in its preferred embodiment, it will be clear to those skilled in the arts to which it pertains that many changes and modifications may be made thereto without departing from the scope of the invention. For example, it will be clear that a common coolant shared between the tractor motor and ICE could be used instead of the separate coolants described, which would permit elimination of some of the components shown, while still maintaining the basic principle of the invention.

I claim:

1. A cooling system for use in a hybrid vehicle having a traction motor drive, a power source therefor, and an internal combustion engine (ICE) operative at times to drive the power source, including a first coolant circulatable through the traction motor for absorbing waste heat therefrom, a second coolant circulatable through the ICE for absorbing waste heat therefrom or adding heat thereto, heat exchanger means connecting the first and second coolants in heat exchanging relationship for at times transferring heat from the first coolant to the second coolant, and temperature responsive means operable during inoperativeness of the ICE and in response to the ICE coolant being below a predetermined temperature to circulate the second coolant through the heat exchanger to scavenge waste heat from the first to second coolant to preheat the ICE.

2. A cooling system as in claim 1, including second heat exchanger means, and second means responsive to operation of the ICE to circulate the second coolant through the second heat exchanger means for the transfer of waste heat from the second coolant thereto.

3. A cooling system as in claim 1, the motor being an electric traction motor, the ICE driving an electrical energy power source for the motor.

4. A cooling system as in claim 1, including electric pump means for circulating the second coolant through the first mentioned heat exchanger means, and thermal control means operable to render operable said electric pump means.

5. A cooling system as in claim 2, the second means including an ICE driven pump for circulating the second coolant through the second heat exchanger, and thermal control means operable to render operable the ICE driven pump.

6. A cooling system as in claim 5, including normally open valve means permitting circulation of the second coolant by the ICE driven pump, and solenoid means operable in response to inoperability of the ICE and the ICE being below the predetermined temperature to close the valve means and permit circulation of the second coolant through the first mentioned heat exchanger.

7. A cooling system for use in a hybrid vehicle having an electrical traction motor drive, a power source therefor, and an ICE operative at times to drive the Power source, including a first coolant circulatable through the traction motor for absorbing waste heat therefrom, a second coolant circulatable through the ICE for absorbing waste heat therefrom or adding heat thereto, heat exchanger means connecting the first and second coolants in heat exchanging relationship for at times transferring heat from the first coolant to the second coolant, second heat exchanger means connectable at times to the ICE second coolant for cooling the same, and control means for circulating the second coolant through the ICE in one path through the second heat exchanger when the ICE is running to divest waste heat therefrom and alternately in a second path through the first mentioned heat exchanger when the ICE is not running to scavenge waste heat from the traction motor first coolant thereto to preheat the ICE coolant.

8. A cooling system as in claim 7, the control means including temperature responsive means connectible to the ICE for sensing the temperature of the ICE, the control means permitting circulation of the second coolant through the first mentioned heat exchanger only when the ICE is below a predetermined temperature.

9. A cooling system as in claim 8, the control means including electric pump means for circulating the second coolant in the second path for the transfer of heat from the first coolant to the second coolant when the engine is not running, and ICE driven pump means for circulating the second coolant in the one path to cool the second coolant when the engine is running.

10. A cooling system as in claim 9, the first and second paths being branches of a main conduit through the ICE, a two position valve means associated with the main conduit and the branches normally biased to one position and movable to the other position for alternately connecting the first and second paths to the main conduit, the first branch path being a first closed loop conduit system through the ICE including the ICE driven pump means and the valve means and the second heat exchanger, the second branch path including a second closed loop conduit system through the ICE including the valve means and the electric pump means and the first mentioned heat exchanger means, and means to move the valve means.

11. A cooling system as in claim 10, including solenoid means connected to the valve means for operating the valve means to one of the two positions.

12. A cooling system as in claim 11, including one-way check valves in each of the paths to prevent circulation of the second coolant in more than one of the paths at a time.

13. A cooling system as in claim 12, wherein the control means is a thermal controller having temperature responsive means connected both to the first mentioned heat exchanger and to the ICE for sensing the temperatures of both the first coolant and the ICE coolant, to activate the electric pump means and solenoid means to move the valve means to permit circulation of the second coolant through the second path so long as the ICE is below a predetermined temperature and not running and the first coolant temperature is greater than the ICE temperature.

14. A cooling system as in claim 13, wherein the power source is an electrical energy generating supply source driven by the ICE.

15. A cooling system as in claim 14, wherein the thermal controller is inoperative when the ICE is running to effect movement of the valve means to permit circulation of the second coolant through the second heat exchanger means while rendering inoperative the electric pump means to prevent circulation of the second coolant through the second path thereby conserving the electrical energy of the hybrid vehicle.

16. A cooling system for a hybrid vehicle having a traction motor having an energy supply input and an output operatively connected to the vehicle to drive the same, an ICE connected to the energy supply to drive the same, a pair of coolant systems, one for the traction motor and one for the ICE, and a heat exchanger interconnected to the coolant systems for the scavenging at times of the waste heat from the traction motor by the coolant of the ICE to prewarm the ICE when the ICE is below a predetermined temperature level and not running.

17. A cooling system for a hybrid vehicle having an electrical traction motor having an output adapted to be connected to the wheels of the vehicle to drive the same, electrical energy input means for charging the motor with electrical energy including an ICE for powering the input means, the ICE having a first cooling system, a second cooling system for the motor, the cooling systems including a heat exchanger connected between the motor and ICE in a manner to transfer the heat output of the motor through the second cooling system to the cooling system of the ICE to preheat the latter when the temperature level of the ICE is below a predetermined level and the ICE is inoperative.

* * * * *